(12) United States Patent
Yeung et al.

(10) Patent No.: US 8,210,310 B1
(45) Date of Patent: Jul. 3, 2012

(54) TUNABLE ACOUSTICAL PLASTER SYSTEM AND METHOD OF MAKING IT

(75) Inventors: Lee K. Yeung, Vernon Hills, IL (US); Enrique L. Albarran, Waukegan, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 12/981,132

(22) Filed: Dec. 29, 2010

(51) Int. Cl.
*E04B 1/82* (2006.01)

(52) U.S. Cl. ........ 181/290; 181/284; 181/286; 181/292; 52/144; 52/145

(58) Field of Classification Search ............... 181/284, 181/286, 292, 290; 52/144, 145
See application file for complete search history.

(56) References Cited

U.S. PATENT DOCUMENTS

| | | | |
|---|---|---|---|
| 1,832,571 A | 11/1931 | Nash | |
| 1,937,011 A | 11/1933 | Eaton | |
| 2,046,296 A | 6/1936 | Roos | |
| 2,060,295 A | 11/1936 | Finefrock et al. | |
| 2,485,259 A | 10/1949 | Christer | |
| 4,010,134 A | 3/1977 | Braunisch et al. | |
| 5,888,626 A | 3/1999 | Sensenig | |
| 6,379,454 B1 * | 4/2002 | Fellert | 106/698 |
| 6,749,920 B1 | 6/2004 | Caldwell et al. | |
| 7,033,963 B2 | 4/2006 | Felegi et al. | |
| 2004/0211934 A1 | 10/2004 | LeStarge | |
| 2005/0103564 A1 * | 5/2005 | Duval et al. | 181/204 |
| 2005/0167194 A1 | 8/2005 | Arner | |
| 2006/0280898 A1 * | 12/2006 | Lettkeman et al. | 428/70 |
| 2007/0055012 A1 * | 3/2007 | Caldwell | 525/54.1 |
| 2007/0102237 A1 * | 5/2007 | Baig | 181/290 |
| 2008/0303191 A1 * | 12/2008 | Miller et al. | 264/333 |
| 2011/0042163 A1 * | 2/2011 | Serre et al. | 181/284 |

* cited by examiner

*Primary Examiner* — Forrest M Phillips
(74) *Attorney, Agent, or Firm* — Greer, Burns & Crain, Ltd.; Pradip Sahu, Esq.; Philip T. Petti, Esq.

(57) ABSTRACT

A method of installing an acoustical system that provides a desired sound attenuation includes attaching an acoustical panel having a first density, a first porosity and a first void volume to the substrate. A first finishing layer is prepared with first particles, a first binder, a first rheological modifier and water which are combined, applied to the substrate and dried. The first finishing layer has a first density. When the first sound attenuation changes to a second sound attenuation a second finishing layer is prepared to include second particles, a second binder, a second rheological modifier and water. The dried second finishing layer has a second density. If the second density is less than the first density, the second sound attenuation is greater than the first sound attenuation. If the second density is greater than the first density, the second sound attenuation is less than the first sound attenuation.

18 Claims, 1 Drawing Sheet

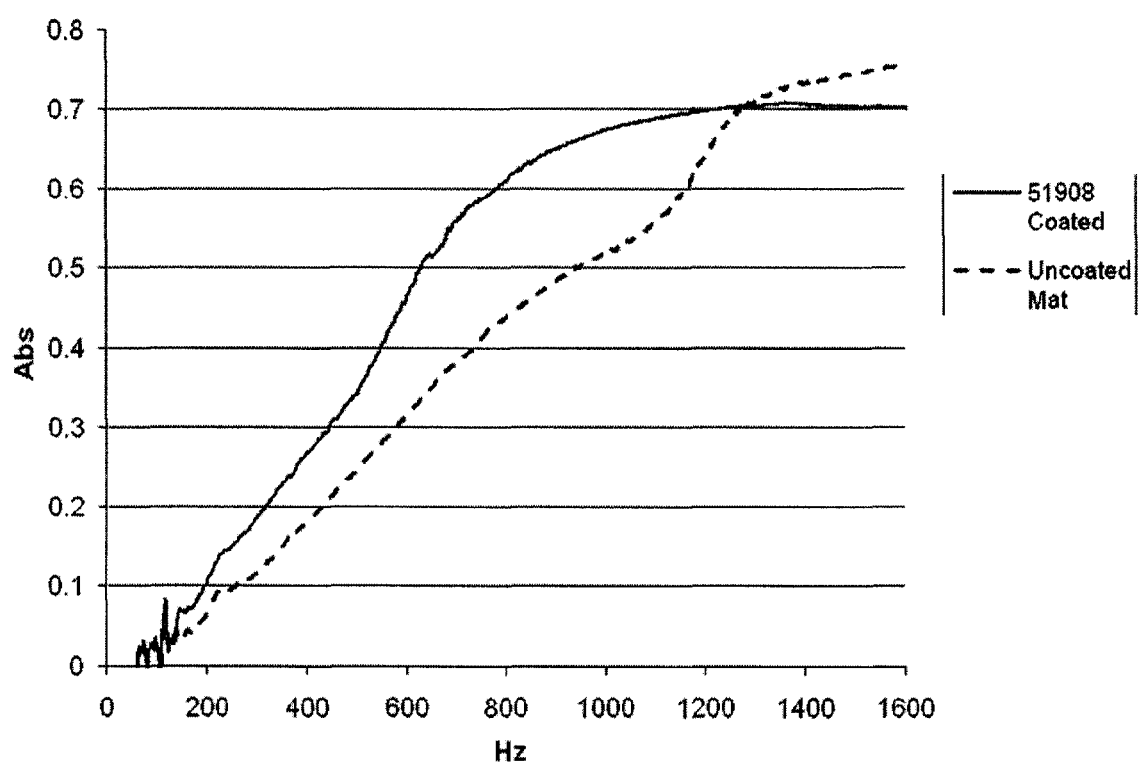

TUNABLE ACOUSTICAL PLASTER SYSTEM AND METHOD OF MAKING IT

BACKGROUND

Currently, there is a growing market for acoustical wall systems. Sounds of urban living can penetrate homes and offices, making it difficult to find quiet interior spaces. Noise pollution is an increasing problem and solutions are being sought that both reduce noise and produce an aesthetically pleasing appearance.

Acoustical ceiling panels have been used for some time, but have not been accepted as providing an aesthetically pleasing appearance. The panels are often formed of a mineral wool composition that is very absorbent of sound. Finishing of the panels includes embossing or needling the panel surface, creating openings into which sounds enter. From the openings, a large fraction of the sound waves are absorbed by the mineral wool. While these acoustical panels are popular for use in basement rooms and recreational areas, they are seldom used in main living areas as they are not considered to be as aesthetically pleasing as other finishing options.

Conventional plaster or dry wall systems are frequently used in the main living areas of homes and office areas. This medium is inexpensive, produces a smooth, monolithic surface and readily receives a number of decorative finishes, such as paint, stencils, wallpaper, decals and the like. However, dry wall and plaster absorb little sound, reflecting some of the sound back into the living area. Some sounds are also distorted, adding to the noise pollution problem. Moreover, there is little variability in the sound attenuation, particularly after the system has been installed.

Even in situations where one of these options provides an ideal sound absorbency solution for a particular room for a time, things change. The use for the room may change to one having different sound absorbency requirements. A TV room might be converted to a study or office. Elements within the room can be replaced with other elements having different sound absorbency, such as replacing wooden furniture with upholstered furniture or carpeted floors with hardwood flooring. More noise may be entering from outside the room. These and other circumstances provide instances where it is desirable to change the acoustical characteristics of the acoustical system even after the sound system has been put into place.

One method of changing the acoustical properties is to totally remove the current acoustical system and replace it with one matching the new desired acoustical properties of the space. Although this method produces the desired acoustical properties, it is extremely expensive and time consuming to replace plaster, wallboard or other acoustical panels with another wall system.

Coatings have been applied to wall system with various degrees of success. The addition of paint or wallpaper to a wall system usually decreases sound attenuation by covering up or sealing pores that allow penetration of sound into the interior of the wall system where it can be absorbed. An additional coating on top of the paint or wallpaper would not significantly increase the sound absorbency of the wall system. Even the sounds that penetrated the entire thickness of the second coating would be reflected by the first coating. Those sounds would again travel the thickness of the second coating and out into the occupiable space. Only sounds that were absorbed by the second coating would be attenuated.

Another known coated panel is an acoustical ceiling tile to which an acoustically transparent coating is applied during installation. The coating gives the smooth, monolithic appearance of wallboard but allows sound to penetrate into the panel. Once installed, the sound deadening properties of this system are not changed without removal of the whole system and reinstalling a new system.

There is an ongoing need for an acoustical system for indoor spaces that will accommodate dynamics that require different levels of sound attenuation without requiring reconstruction of the acoustical walls and or ceilings of the space.

SUMMARY OF THE INVENTION

A present method relates to installing an acoustical finishing system to a substrate that provides a desired sound attenuation to an occupied space. An acoustical panel is attached to the substrate of the occupied space, where the panel has a first density, a first porosity and a first void volume. Components are selected for a first finishing layer that includes a first plurality of non-close packing first particles, a first binder, a first rheological modifier and a first portion of water. These components are then combined to make the first finishing layer. After applying the first finishing layer to the substrate, it is allowed to dry. The density of the dried first finishing layer is the first density, the porosity of the dried first finishing layer is the first porosity and the void volume of the dried first finishing layer is the first void volume. The combination of the acoustical panel and the dried first finishing layer produces the first desired sound attenuation in the occupied space.

When the first desired sound attenuation changes to a second desired sound attenuation a second finishing layer is prepared. Components for the second finishing layer are selected to include a second plurality of non-close packing second particles, a second binder, a second rheological modifier and a second portion of water. The components for the second finishing layer are combined to make the second finishing layer and it is applied to the first finishing layer then allowed to dry. After drying, the dried second finishing layer has a second density, a second void volume and a second porosity, and the combination of the substrate, the first finishing layer and the second finishing layer produces the second desired sound attenuation in the occupied space.

By selecting the components of the first finishing layer and the second finishing layer, the sound properties may be tuned to produce a final sound attenuation when the acoustical properties in the occupiable space have changed. If the second density is less than or equal to the first density, then the second desired sound attenuation is greater than the first desired sound attenuation. If the second density is greater than the first density, the second desired sound attenuation is less than the first desired sound attenuation.

Spaces where acoustical panels with a first finishing layer have been installed can achieve more or less sound attenuation by the addition of a second finishing layer. It would not be necessary to remove the acoustical panels and replace them with panels having different sound properties. This results in savings of time, the cost of raw materials and services in replacing the acoustical panels.

In newer construction, rather than having to stock a large number of acoustical panels of varying properties, the same panel could be used in more situations. The needs of particular areas could then be modified using the finishing layers. Cost savings of maintaining a large inventory of acoustical panels could be realized.

DETAILED DESCRIPTION OF THE DRAWINGS

FIG. 1 shows the sound attenuation properties of an uncoated mineral fiber acoustical mat compared to a mat with the application of a single thick layer of the coating material.

DETAILED DESCRIPTION OF THE INVENTION

This invention relates to a method of installing an acoustical finishing system. The acoustical finishing system provides a desired sound attenuation to an occupied space, even if the occupied space is already finished with a base acoustical panel and a finishing layer. A significant advantage of this acoustical system is the ability to adapt it to preexisting acoustical systems, such as embodiments where an acoustical panel and a first finishing layer are present in an occupiable space. Unless otherwise noted, the amount of any component is expressed in weight percent and is based on the total weight of the dry components of the specific component being discussed.

The present acoustical finishing system provides a desired sound attenuation to a space. It also provides for changes in acoustical properties without necessitating complete removal of the entire underlying panel system, even after the system has initially been installed.

Installation of the acoustical system begins by attaching a wall panel having a first density to a substrate of the occupiable space, said panel having a first density. Typically the acoustics of the panel are somewhat matched to the desired acoustics of the space in which the installation takes place. Examples of panels include panels made with gypsum, mineral wool, fiberglass, wood particles, inorganic particles and the like. Friable materials, such as mineral wool, are preferred so that the joints of the panels can be blended together during installation.

The wall panel can have sound attenuation, neutral or non-attenuation properties. A conventional gypsum panel would be useful where little sound absorption is needed, for example, where a large number of upholstered furniture pieces are present to absorb sound or in a room where lively acoustics are desired. A panel with more sound absorbency would be useful in a study or office where quiet is more conducive to work or study. Panels for such a room may have a fiberglass facing that transmits sound into the interior of the panel and mineral wool inside the panel to absorb the sounds.

The panels are attached by any means known to one of ordinary skill in the art. Fasteners are optionally used to attach the panels to the substrate. Suitable fasteners include screws, nails or brads. Optionally, an adhesive is useful in bonding the panel to the substrate in place of fasteners. Any suitable adhesive, such as construction adhesive, is useful for this purpose.

A first finishing layer material is prepared having a plurality of fillers. Many different types of fillers are useful, including inorganic aggregates, organic particles, inorganic fibers and organic fibers. Inorganic aggregates include any solid, chemically inert materials, such as sand, gravel, crushed rock, perlite, vermiculite, mica, talc and calcium carbonate as well as hollow materials such as ceramic spheres, expanded perlite and expanded glass beads. The use of any combinations or mixtures of fillers is also contemplated. Organic particles include resin beads or hollow resin microspheres. Inorganic fibers include fiberglass fibers and mineral fibers. Organic fibers include spun resin fibers and natural cellulosic fibers. Examples of preferred fillers include ceramic spheres, expanded perlite, porous ceramic spheres and expanded glass beads. Fillers are used in amounts of about 3% to about 80% by weight based on the weight of the dry components of the finishing layer. The filler preferably has a particle size preferably in the 100-500 micron range. In some embodiments, the shape of the filler is between spherical and acicular. Irregular shapes reduce close packing of the particles, making the first finishing layer more porous and less dense. Lightweight fillers, such as expanded perlite, are used in some embodiments, such as RYOLEX® 39 brand expanded perlite (Silbrico Corp., Hodgkins, Ill.).

Binders are present to hold the first finishing layer materials together and bond the first finishing layer to the panel. Latex or organic binders are preferred. Examples of suitable binders include polyacetate and polyacrylic emulsions. HP 41-830 latex polymer is one embodiment of a binder. Amounts of binders vary from about 1% to about 15% based on the total weight of the dry components.

One or more rheological modifiers are added to the first finishing layer to alter the dispersability of the solids in water. Preferred rheological modifiers include cellulose thickeners such as methylated cellulose, clays such as Attapulgite clay, modified starches and combinations thereof. The amount of the rheological modifier varies from about 0.01% to about 10% by weight of the first finishing layer. Use of rheological modifiers that form foam due to entrainment of air are desired for reducing the density of the first finishing layer. Preferred rheology modifiers include Starpol® 163 brand starch (A. E. Staley, Decatur, Ill.) and Super Gel B attapulgite clay (Fitz Chem Corp., Itasca, Ill.).

Water is added in sufficient amounts to form a spreadable paste. In some embodiments, the amount of water is from about 30% to about 85% by weight based on the combined weight of the dry ingredients of the first finishing layer. The first finishing layer is formed by separately combining the wet ingredients and the dry ingredients, then blending the wet ingredients and dry ingredients together.

Optionally, the first finishing layer also includes a colorant. Pigments, dyes, tints and combinations thereof are useful in varying the appearance of the acoustical layer. The variety of the colorants allows the coating to be opague or transparent as desired. An example of a suitable colorant is DCS® brand colorant.

The first finishing layer material has a different composition than that of the wall panel. However, the density of the first finishing layer is substantially the same as the first density of the wall panel. The phrase "substantially the same" is intended to mean that the density of the first finishing layer is the same as the density of the wall panel or that the difference between the two densities is ±5%.

After the first finishing layer is formed, it is applied to the panel by any means. In some embodiments, the first finishing layer is applied to the panels as they are made. Conventional coating apparatus are known for application of coating layers, such as rod coaters, spray coaters, curtain coaters, screed coaters and bar coaters. It is also contemplated that the first finishing layer be applied by hand, after its installation in the consumer's home. In such embodiments, the first finishing layer is applicable using a hawk and trowel or similar device.

Following application of the first finishing layer, it is allowed to dry. The dried first finishing layer resulting in a density equal to the first density while maintaining the same void space or porosity, wherein the combination of the acoustical panel and the dried first finishing layer produces the first desired sound attenuation in the occupied space.

At any time, circumstances may dictate changing the first desired sound attenuation to a second desired sound attenuation. The circumstances may include change in the use of a room, acquisition of new furniture or laying of a floor with different sound characteristics. Sound attenuation of the substrate and the first finishing layer is effected by preparing a second finishing layer material that includes a plurality of inorganic aggregates, organic particles, inorganic fibers, organic fibers, organic binders, rheological modifiers and water. Many of the same fillers, fibers, binders and rheological modifiers suitable in the first finishing layer are also useful in the second finishing layer. However, the choice of the particular filler, fiber, binder and rheological modifier for a particular second finishing layer depends upon the change in the sound attenuation from the first finishing layer that is desired.

Additional sound deadening may be desirable where, for example, carpeting in a room replaces hardwood floors. The carpet flooring would reflect less sound than the hardwood. Application of a second finishing layer to the first finishing layer is useful to maintain the same sound characteristics in the room as was present prior to the flooring change. In this case, the second desired sound attenuation is less than the first sound attenuation. To achieve this, the second finishing layer, when dried, has a second density that is greater than the first density.

In some embodiments, the second density is increased over the first density by decreasing the void space or porosity of the second finishing layer over the first finishing layer. The combination of the acoustical panel, the dried first finishing layer and the dried second finishing layer produces the second desired sound attenuation in the occupied space. Selection of fillers and fibers in the second finishing layer are selected to produce the higher density by, for example, having harder surfaces or packing more tightly together.

If, for example, carpeted floors are replaced by hardwood, the second desired sound attenuation is greater than the first desired sound attenuation because the hardwood reflects more sound into the space. To achieve this greater sound attenuation, the second density is less than or equal to the first density. Where this is the case, the fillers, fibers, binder and rheological modifiers and their relative amounts are selected to decrease the second density compared to the first density. The density of the first finishing layer and the second finishing layer are always compared on a dry basis. Specific embodiments of the second finishing layer may utilize lightweight aggregates, such as expanded perlite, vermiculite, mineral wools and other lightweight materials.

The second finishing layer is applied to the first finishing layer and the second finishing layer is allowed to dry. The dried second finishing layer has a second density, a second void volume and a second porosity. The combination of the substrate, the first finishing layer and the second finishing layer produces the second desired sound attenuation in the occupied space.

The first finishing layer material has a different composition than that of the wall panel. However, the density of the first finishing layer is substantially the same as the first density of the wall panel. The phrase "substantially the same" is intended to mean that the density of the first finishing layer is the same as the density of the wall panel or that the difference between the two densities is ±5%.

Example 1

A coating was prepared by combining the components of Table I in the amounts listed demonstrating the ability of our coating to tune the acoustical properties.

TABLE I

COATING COMPOSITION

| Component | Trade Name | Amount | Percentage |
|---|---|---|---|
| Rheological Modifier | Super Gel B | 56 g. | 2.3% |
| Colorant | DCS ® | 13.6 g. | 0.5% |
| Starch | STARPOL ® 163 | 8.2 g. | 0.3% |
| Binder | HP 41-830 | 108 g. | 4.3% |
| Carrier | Water | 1988.6 g. | 79.1% |
| Filler | RYOLEX ® 39 Perlite | 338.6 g. | 13.5% |

The coating was applied to the same mineral fiber basemat in subsequent layers as shown in Table II. The applied coatings were prepared by adding 130 g water to 1698 g of the coating of Table I. The first layer was applied to the basemat, resulting in a thin coating. This sample set is designated as Sample No. 061108B. A second coating was applied once the first coating was dried to produce the sample set designated as Sample No. 061108A. After the second coating was dried, a final coating was applied and the sample set designated as Sample No. 031108. The sound absorption data derived from airflow resistivity measurements are shown in TABLE III.

TABLE II

Coating thickness and NRC Correlation

| Sample | Coating thickness (in) | NRC |
|---|---|---|
| Control (mat, no coating) | 0.00 | 0.70 (measured NRC) |
| 061108B | 0.07 | 0.58 |
| 061108A | 0.09 | 0.64 |
| 031108 | 0.13 | 0.70 |

TABLE III

PERFORMANCE OF COATINGS OF TABLE II

| Sample | NRC | Density | Airflow Resistivity | Specific Airflow Resistance |
|---|---|---|---|---|
| 031108-1 | 0.69 | 12.15 | 0.21 | 4.31E+03 |
| 031108-2 | 0.73 | 12.00 | 0.18 | 3.70E+03 |
| 031108-3 | 0.68 | 12.26 | 0.22 | 4.63E+03 |
| 031108-4 | 0.67 | 12.04 | 0.21 | 4.54E+03 |
| 031108-5 | 0.69 | 12.25 | 0.22 | 4.63E+03 |
| 031108-6 | 0.71 | 11.98 | 0.17 | 3.50E+03 |
| Average | 0.70 | 12.11 | 0.20 | 4.22E+03 |
| 061108A-1 | 0.63 | 11.76 | 0.35 | 6.85E+03 |
| 061108A-2 | 0.65 | 12.02 | 0.39 | 7.97E+03 |
| 061108A-3 | 0.63 | 12.06 | 0.36 | 7.22E+03 |
| 061108A-4 | 0.62 | 11.85 | 0.40 | 7.98E+03 |
| 061108A-5 | 0.64 | 11.79 | 0.35 | 6.92E+03 |
| 061108A-6 | 0.67 | 11.91 | 0.30 | 5.84E+03 |
| Average | 0.64 | 11.90 | 0.36 | 7.13E+03 |
| 061108B-1 | 0.59 | 11.98 | 0.34 | 6.63E+03 |
| 061108B-2 | 0.56 | 11.68 | 0.36 | 6.95E+03 |
| 061108B-3 | 0.54 | 11.81 | 0.41 | 8.03E+03 |
| 061108B-4 | 0.56 | 11.97 | 0.38 | 7.47E+03 |
| 061108B-5 | 0.65 | 11.73 | 0.31 | 6.08E+03 |
| 061108B-6 | 0.60 | 11.58 | 0.34 | 6.61E+03 |
| Average | 0.58 | 11.79 | 0.36 | 6.96E+03 |

Whereas the above data shows an initial decrease in NRC value when a thin layer of the material is applied, additional testing shows the sound attenuation properties of an uncoated mineral fiber acoustical mat can be increased, as tested using an acoustical impedance tube, with the application of a single thick layer of the coating material as shown in FIG. 1.

What is claimed is:

1. A method of installing an acoustical finishing system to a substrate that provides a desired sound attenuation to an occupied space, said method comprising:
   attaching an acoustical panel to a substrate of the occupied space, said panel having a first density, a first porosity and a first void volume;
   selecting components for a first finishing layer comprising a first plurality of non-close packing first particles, a first binder, a first rheological modifier and a first portion of water;
   combining the components for the first finishing layer to make the first finishing layer;
   applying the first finishing layer to the substrate;
   allowing the first finishing layer to dry, wherein following said allowing step the density of the dried first finishing layer is the first density, the porosity of the dried first finishing layer is the first porosity and the void volume of the dried first finishing layer is the first void volume, and wherein the combination of the acoustical panel and the dried first finishing layer produces the first desired sound attenuation in the occupied space;
   changing the first desired sound attenuation to a second desired sound attenuation;
   selecting components for a second finishing layer comprising a second plurality of non-close packing second particles, a second binder, a second rheological modifier and a second portion of water;
   combining the components for the second finishing layer to make the second finishing layer;
   applying the second finishing layer to the first finishing layer; and
   allowing the second finishing layer to dry, wherein following said second finishing step, the dried second finishing layer has a second density, a second void volume and a second porosity and wherein the combination of the substrate, the first finishing layer and the second finishing layer produces the second desired sound attenuation in the occupied space; and wherein if the second desired sound attenuation is greater than the first desired sound attenuation, the second density is less than or equal to the first density and if the second desired sound attenuation is less than the first desired sound attenuation, the second density is greater than the first density.

2. The method of claim 1 further comprising selecting the acoustical panel that comprises fiberglass, wood particles, inorganic particles, mineral wool, natural fibers, synthetic fibers and combinations thereof.

3. The method of claim 1, wherein the first particles of said first selecting step or the second particles of said second selecting step have a particle size distribution of from about 100 to about 500 microns.

4. The method of claim 1 further comprising selecting the first particles or the second particles to have a mean diameter range of about 30 to about 150 mesh.

5. The method of claim 1 further comprising selecting the first particles to have a shape between spherical and acicular.

6. The method of claim 1 further comprising selecting the binder from the group consisting of polyacetate emulsion and polyacrylic emulsion.

7. The method of claim 1 further comprising selecting the rheological modifier from the group consisting of cellulosic thickeners, clays and modified starches.

8. The method of claim 1 wherein at least one of said applying steps comprises applying the finishing layer by hand.

9. The method of claim 1 wherein the components of the first preparing step and said second preparing step are selected so that the first density is greater than the second density.

10. The method of claim 1 wherein the components of the first preparing step and said second preparing step are selected so that the first density is less than the second density.

11. The system of claim 1 wherein the non-close packing first particles comprise inorganic particles, organic particles, inorganic fibers, organic fibers, aggregates or combinations thereof.

12. An acoustical panel system comprising:
   an acoustical panel having a first density, a first porosity, and a first void volume;
   a first finishing layer comprising a first non-close packing filler, a first binder and a first rheological modifier, wherein said first filler comprises non-close packing particles having a particle size of from about 100 to about 500 microns, said first finishing layer having a second density, a second porosity and a second void volume, wherein said second density is substantially equal to said first density and either said second porosity is substantially equal to said first porosity or said second void volume is substantially equal to said first void volume; and
   a second finishing layer comprising a second filler, a second binder and a second rheological modifier, said second finishing layer having a third density, a third porosity and a third void volume, wherein either said third density is substantially equal to said second density, said third porosity is substantially equal to said second porosity or said third void volume is substantially equal to said second void volume.

13. The system of claim 12 wherein at least one of said first binder and said second binder comprises one of the group consisting of polyacetate emulsion and polyacrylate emulsions.

14. The system of claim 12 wherein at least one of said first rheological modifier and said second rheological modifier comprises one of the group consisting of methylated cellulose, clays and modified starches.

15. The system of claim 12 wherein said first non-close packing has a particle size distribution of from 100 to about 500 microns.

16. The system of claim 12 wherein the second non-close packing has a particle size distribution of from 100 to about 500 microns.

17. The system of claim 15 wherein said fibers comprise one of organic fibers, inorganic fibers or combinations thereof.

18. A method of changing the sound attenuation properties of a panel, comprising:
   selecting a panel installed in an occupiable space, said panel including a first finishing layer comprising a first non-close packing filler, a first binder and a first rheological modifier, wherein said first filler comprises non-close packing particles having a particle size of from about 100 to about 500 microns, said first finishing layer having a second density, a second porosity and a second void volume, wherein said second density is substantially equal to said first density and either said second porosity is substantially equal to said first porosity or said second void volume is substantially equal to said first void volume;
   changing the first desired sound attenuation to a second desired sound attenuation;

selecting components for a second finishing layer comprising a second plurality of non-close packing second particles, a second binder, a second rheological modifier and a second portion of water;
combining the components for the second finishing layer to make the second finishing layer;
applying the second finishing layer to the first finishing layer; and
allowing the second finishing layer to dry, wherein following said second finishing step, the dried second finishing layer has a second density, a second void volume and a second porosity and wherein the combination of the substrate, the first finishing layer and the second finishing layer produces the second desired sound attenuation in the occupied space; and wherein if the second desired sound attenuation is greater than the first desired sound attenuation, the second density is less than or equal to the first density and if the second desired sound attenuation is less than the first desired sound attenuation, the second density is greater than the first density.

* * * * *